US011769276B2

(12) United States Patent
Lee et al.

(10) Patent No.: US 11,769,276 B2
(45) Date of Patent: Sep. 26, 2023

(54) METHOD, APPARATUS, AND STORAGE MEDIUM USING PADDING/TRIMMING IN COMPRESSION NEURAL NETWORK

(71) Applicant: Electronics and Telecommunications Research Institute, Daejeon (KR)

(72) Inventors: Joo-Young Lee, Daejeon (KR); Se-Yoon Jeong, Daejeon (KR); Hyoung-Jin Kwon, Daejeon (KR); Dong-Hyun Kim, Daejeon (KR); Youn-Hee Kim, Daejeon (KR); Jong-Ho Kim, Daejeon (KR); Tae-Jin Lee, Daejeon (KR); Jin-Soo Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 213 days.

(21) Appl. No.: 17/192,480

(22) Filed: Mar. 4, 2021

(65) Prior Publication Data
US 2021/0279912 A1 Sep. 9, 2021

(30) Foreign Application Priority Data

Mar. 5, 2020 (KR) .................. 10-2020-0027803
Feb. 26, 2021 (KR) .................. 10-2021-0026795

(51) Int. Cl.
*G06T 9/00* (2006.01)
*G06T 3/40* (2006.01)
(Continued)

(52) U.S. Cl.
CPC ............ *G06T 9/002* (2013.01); *G06T 3/4046* (2013.01); *G06V 10/454* (2022.01); *G06V 10/764* (2022.01); *G06V 10/82* (2022.01)

(58) Field of Classification Search
CPC ...... G06T 9/002; G06T 3/4046; G06V 10/454; G06V 10/82; G06V 10/764
(Continued)

(56) References Cited

U.S. PATENT DOCUMENTS 10,321,155 B2   6/2019  Yoo et al.
10,841,577 B2  11/2020  Cho et al.
(Continued)

FOREIGN PATENT DOCUMENTS

EP        3567857 A1   11/2019
KR       101663668 B1  10/2016
KR     1020190096281 A   8/2019

OTHER PUBLICATIONS

Ronneberger "Unet: Convolutional Networks for Biomedical Image Segmentation", Springer 2015 (Year: 2015).*
(Continued)

*Primary Examiner* — Mark Roz
(74) *Attorney, Agent, or Firm* — William Park & Associates Ltd.

(57) ABSTRACT

An encoding apparatus extracts features of an image by applying multiple padding operations and multiple downscaling operations to an image represented by data and transmits feature information indicating the features to a decoding apparatus. The multiple padding operations and the multiple downscaling operations are applied to the image in an order in which one padding operation is applied and thereafter one downscaling operation corresponding to the padding operation is applied. A decoding method receives feature information from an encoding apparatus, and generates a reconstructed image by applying multiple upscaling operations and multiple trimming operations to an image represented by the feature information. The multiple upscaling operations and the multiple trimming operations are applied to the image in an order in which one upscaling
(Continued)

operation is applied and thereafter one trimming operation corresponding to the upscaling operation is applied.

11 Claims, 8 Drawing Sheets

(51) Int. Cl.
    *G06V 10/764* (2022.01)
    *G06V 10/82* (2022.01)
    *G06V 10/44* (2022.01)

(58) Field of Classification Search
    USPC .......................................................... 382/190
    See application file for complete search history.

(56) References Cited

U.S. PATENT DOCUMENTS

| | | |
|---|---|---|
| 2017/0104993 A1 | 4/2017 | Jeong et al. |
| 2018/0249158 A1 | 8/2018 | Huang et al. |
| 2019/0246102 A1 | 8/2019 | Cho et al. |

OTHER PUBLICATIONS

Geglio, Deep Convolutional Autoencoder for Assessment of Anomalies in Multi-stream Sensor Data, Feb. 2022 (Year: 2022).*

* cited by examiner

METHOD, APPARATUS, AND STORAGE MEDIUM USING PADDING/TRIMMING IN COMPRESSION NEURAL NETWORK

CROSS REFERENCE TO RELATED APPLICATIONS

This application claims the benefit of Korean Patent Application Nos. 10-2020-0027803, filed Mar. 5, 2020 and 10-2021-0026795, filed Feb. 26, 2021, which are hereby incorporated by reference in their entireties into this application.

BACKGROUND OF THE INVENTION

1. Technical Field

The present disclosure relates generally to a method, an apparatus and a storage medium using a compression neural network to perform encoding/decoding on an image. More particularly the present disclosure relates to a method, an apparatus, and a storage medium for performing padding/trimming in a compression neural network.

2. Description of the Related Art

Recently, research into learned image compression methods has been actively conducted. Among the learned image compression methods, entropy-minimization-based approaches have achieved results superior to those of typical image codecs, such as Better Portable Graphics (BPG) and Joint Photographic Experts Group (JPEG) 2000.

Recently, Artificial Neural Networks (ANNs) have reached various fields, and a many breakthroughs have been accomplished owing to excellent optimization and learning performance thereof.

In image compression fields, image/video data compression networks using neural networks have been developed. These data compression networks mainly include a convolutional layer.

Most data compression networks perform downscaling on input data and feature data during a compression process and perform upscaling during a reconstruction process.

A conventional data compression network mainly performs padding on input data so as to respond to input data having various sizes. Further, the conventional data compression network may perform specific processing to prevent compressed data from being lost or prevent inefficiency from occurring due to downscaling and upscaling in the data compression network.

However, such a conventional scheme is problematic in that the padding area of input data is further increased as the ratio of downscaling/upscaling in the entire data compression network is increased, thus deteriorating compression efficiency.

SUMMARY OF THE INVENTION

An embodiment is intended to provide a method, an apparatus, and a storage medium using padding/trimming in a compression neural network.

In accordance with an aspect, there is provided an encoding method performed by an encoding apparatus, including extracting features of an image by applying multiple padding operations and multiple downscaling operations to an image represented by data; and transmitting feature information indicating the features to a decoding apparatus.

The multiple padding operations and the multiple downscaling operations may be applied to the image in an order in which one padding operation is applied to the image and thereafter one downscaling operation corresponding to the padding operation is applied to the image.

Each of the multiple downscaling operations may be configured to decrease a size of the image to 1/n in a horizontal direction and to 1/n in a vertical direction.

n is an integer equal to or greater than 2.

In each of the multiple padding operations and each of the multiple downscaling operations, each padding operation may be configured to adjust a size of the image to a multiple of 2

A ratio of a downscaling operation corresponding to each padding operation may be ½.

Each of the multiple downscaling operations may include processing of a convolutional layer and/or nonlinear processing of the image.

Ratios of the multiple downscaling operations may be different from each other.

Ranges of one or more lines that are capable of being added through the multiple padding operations may be different from each other.

Information about an original size of the image may be transmitted to the decoding apparatus.

Number-of-lines information indicating numbers of one or more lines that are added through the multiple padding operations may be transmitted to the decoding apparatus.

In accordance with another aspect, there is provided a decoding method performed by a decoding apparatus, including receiving feature information from an encoding apparatus; and generating a reconstructed image by applying multiple upscaling operations and multiple trimming operations to an image represented by the feature information.

The multiple upscaling operations and the multiple trimming operations may be applied to the image in an order in which one upscaling operation is applied to the image and thereafter one trimming operation corresponding to the upscaling operation is applied to the image.

A number of pairs of the multiple upscaling operations and the multiple trimming operations may be identical to a number of pairs of multiple padding operations and multiple downscaling operations performed by the encoding apparatus.

Each of the multiple upscaling operations may be configured to adjust a size of the image to n times, where n is an integer equal to or greater than 2.

Each of the multiple upscaling operations may be configured to increase a size of the image to n times.

Each of the multiple trimming operations may be configured to remove, one or more lines identical to a number of one or more lines that are added through a padding operation performed by the encoding apparatus, from the image to which the upscaling operation is applied.

n may be an integer equal to or greater than 2.

Information about an original size of the image may be received from the encoding apparatus.

Number-of-lines information indicating numbers of one or more lines that are added through multiple padding operations performed by the encoding apparatus may be received from the encoding apparatus.

Ratio information may be received from the encoding apparatus.

The ratio information may include ratios of multiple downscaling operations performed by the encoding apparatus or reciprocals of the ratios of the multiple downscaling operations performed by the encoding apparatus.

A k-th upscaling operation, among the multiple upscaling operations, may be configured to adjust a size of the image to $S_k$ times.

k may be an integer that is equal or greater than 1 and less than or equal to m.

m may be a number of the multiple downscaling operations.

$S_k$ may be determined based on the ratio information.

A k-th trimming operation on the image, among the multiple trimming operations, may be configured to remove, from the image, a number of lines identical to a number of lines that are added through a k-th padding operation corresponding to the k-th trimming operation, among multiple padding operations performed by the encoding apparatus.

k may be an integer that is equal to or greater than 1 and less than or equal to m.

m may be a number of the multiple downscaling operations.

A padding operation performed in a k-th order, among m padding operations performed by the encoding apparatus, may correspond to a trimming operation performed in an (m−k+1)-th order, among m trimming operations performed by the decoding apparatus.

k may be an integer that is equal to or greater than 1 and less than or equal to m.

m may be a number of the multiple downscaling operations.

In accordance with a further aspect, there is provided a computer-readable storage medium storing a bitstream, the bitstream including feature information, wherein a reconstructed image may be generated by applying multiple upscaling operations and multiple trimming operations to an image represented by the feature information.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Figure 1:
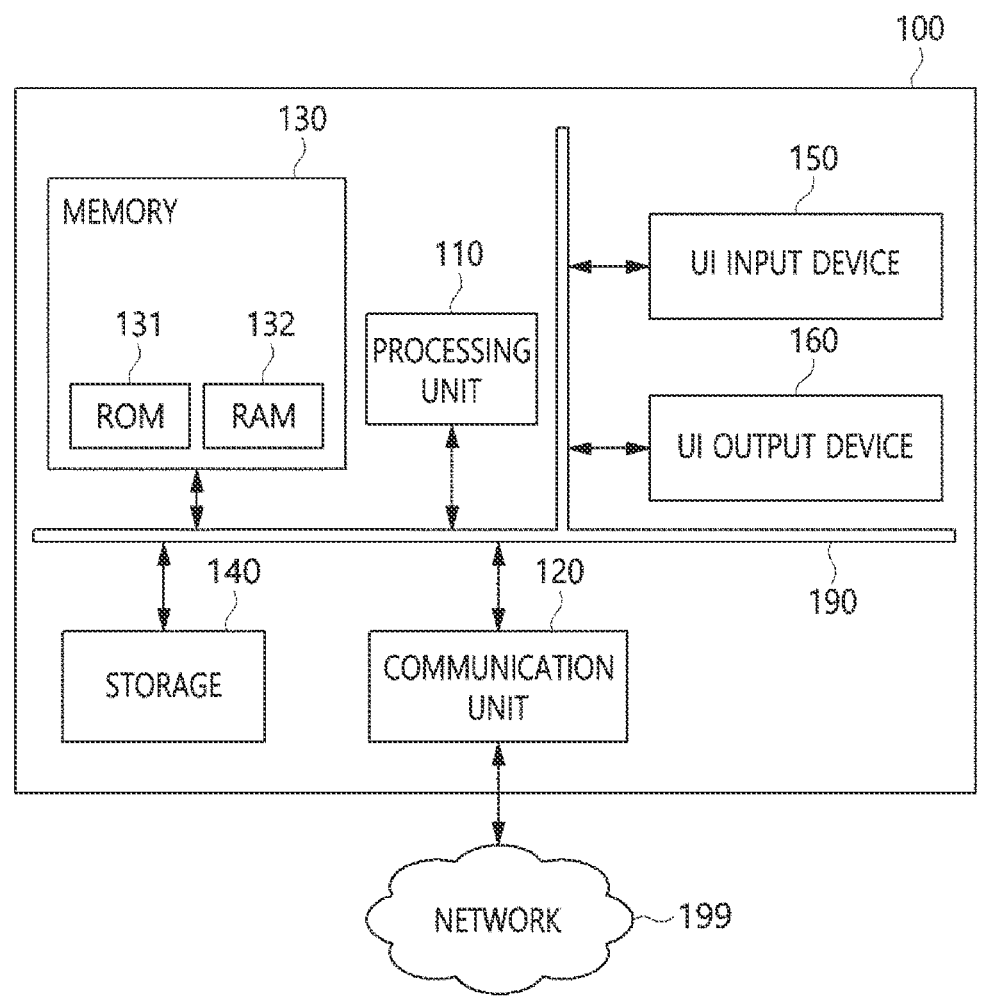
FIG. 1 is a configuration diagram of an encoding apparatus according to an embodiment.

The present disclosure may have various changes and various embodiments, and specific embodiments will be illustrated in the attached drawings and described in detail below. However, this is not intended to limit the present disclosure to particular modes of practice, and it is to be appreciated that all changes, equivalents, and substitutes that do not depart from the spirit or technical scope of the present disclosure are encompassed in the present disclosure.

Detailed descriptions of the following exemplary embodiments will be made with reference to the attached drawings illustrating specific embodiments. These embodiments are described so that those having ordinary knowledge in the technical field to which the present disclosure pertains can easily practice the embodiments. It should be noted that the various embodiments are different from each other, but are not necessarily mutually exclusive from each other. For example, specific shapes, structures, and characteristics described herein may be implemented as other embodiments without departing from the spirit and scope of the embodiments in relation to an embodiment. Further, it should be understood that the locations or arrangement of individual components in each disclosed embodiment can be changed without departing from the spirit and scope of the embodiments. Therefore, the accompanying detailed description is not intended to restrict the scope of the disclosure, and the scope of the exemplary embodiments is limited only by the accompanying claims, along with equivalents thereof, as long as they are appropriately described.

In the drawings, similar reference numerals are used to designate the same or similar functions in various aspects. The shapes, sizes, etc. of components in the drawings may be exaggerated to make the description clear.

In the present disclosure, it will be understood that, although the terms "first", "second", etc. may be used herein to describe various components, these components should not be limited by these terms. These terms are only used to distinguish one component from other components. For instance, a first component discussed below could be termed a second component without departing from the teachings of the present disclosure. Similarly, a second component could also be termed a first component. The term "and/or" includes any and all combinations of one or more of the associated listed items.

It will be understood that when a component is referred to as being "connected" or "coupled" to another component, it can be directly connected or coupled to the other component, or intervening components may be present. In contrast, it should be understood that when a component is referred to as being "directly coupled" or "directly connected" to another component, there are no intervening component present.

The components described in the embodiments are independently shown in order to indicate different characteristic functions, but this does not mean that each of the components is formed of a separate piece of hardware or software. That is, components are arranged and included separately for convenience of description. For example, at least two of the components may be integrated into a single component. Conversely, one component may be divided into multiple components. An embodiment into which the components are integrated or an embodiment in which some components are separated is included in the scope of the present specification, as long as it does not depart from the essence of the present specification.

Further, it should be noted that, in exemplary embodiments, an expression describing that a component "comprises" a specific component means that additional components may be included in the scope of the practice or the technical spirit of exemplary embodiments, but do not preclude the presence of components other than the specific component.

The terms used in the present specification are merely used to describe specific embodiments and are not intended to limit the present disclosure. A singular expression includes a plural expression unless a description to the contrary is specifically pointed out in context. In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Further, some components are not essential components for performing essential functions, but may be optional components for improving only performance. The embodiments may be implemented using only essential components for implementing the essence of the embodiments. For example, a structure including only essential components, excluding optional components used only to improve performance, is also included in the scope of the embodiments.

Embodiments of the present disclosure are described with reference to the accompanying drawings in order to describe the present disclosure in detail so that those having ordinary knowledge in the technical field to which the present disclosure pertains can easily practice the present disclosure. In the following description of the present disclosure, detailed descriptions of known functions and configurations which are deemed to make the gist of the present disclosure obscure will be omitted. It should be noted that the same reference numerals are used to designate the same or similar components throughout the drawings, and that descriptions of the same components will be omitted.

FIG. 1 is a configuration diagram of an encoding apparatus according to an embodiment.

An encoding apparatus 100 may include a processing unit 110, memory 130, a user interface (UI) input device 150, a UI output device 160, and storage 140, which communicate with each other through a bus 190. The encoding apparatus 100 may further include a communication unit 120 connected to a network 199.

The processing unit 110 may be a Central Processing Unit (CPU) or a semiconductor device for executing processing instructions stored in the memory 130 or the storage 140. The processing unit 110 may be at least one hardware processor.

The processing unit 110 may generate and process signals, data or information that are input to the encoding apparatus 100, are output from the encoding apparatus 100, or are used in the encoding apparatus 100, and may perform examination, comparison, determination, etc. related to the signals, data or information. In other words, in embodiments, the generation and processing of data or information and examination, comparison and determination related to data or information may be performed by the processing unit 110.

The program modules may be physically stored in various types of well-known storage devices. Further, at least some of the program modules may also be stored in a remote storage device that is capable of communicating with the encoding apparatus 100.

The program modules may include, but are not limited to, a routine, a subroutine, a program, an object, a component, and a data structure for performing functions or operations according to an embodiment or for implementing abstract data types according to an embodiment.

Respective steps performed by the processing unit 110 may correspond to program modules. The program modules may be implemented using instructions or code executed by at least one processor of the encoding apparatus 100.

The storage unit may denote the memory 130 and/or the storage 140. Each of the memory 130 and the storage 140 may be any of various types of volatile or nonvolatile storage media. For example, the memory 130 may include at least one of Read Only Memory (ROM) 131 and Random Access Memory (RAM) 132.

The storage unit may store data or information used for the operation of the encoding apparatus 100. In an embodiment, the data or information of the encoding apparatus 100 may be stored in the storage unit.

For example, the storage unit may store a picture, a block, a list, motion information, inter-prediction information, a bitstream, etc.

The encoding apparatus 100 may be implemented in a computer system including a computer-readable storage medium.

The storage medium may store at least one module required for the operation of the encoding apparatus 100. The memory 130 may store at least one module, and may be configured such that the at least one module is executed by the processing unit 110.

Functions related to communication of the data or information of the encoding apparatus 100 may be performed through the communication unit 120.

The communication unit 120 may transmit the bitstream to a decoding apparatus 200, which will be described below.

Figure 2:
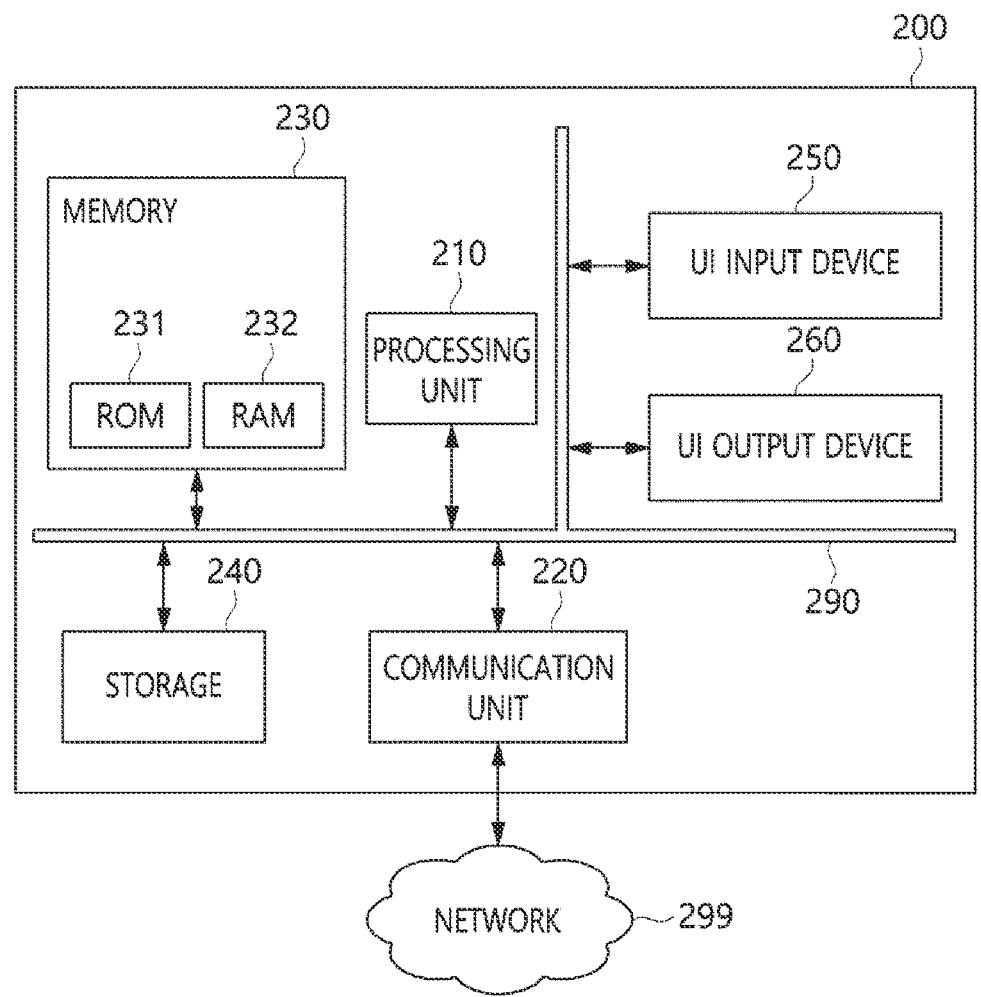
FIG. 2 is a configuration diagram of a decoding apparatus according to an embodiment.

FIG. 2 is a configuration diagram of a decoding apparatus according to an embodiment.

A decoding apparatus 200 may include a processing unit 210, memory 230, a user interface (UI) input device 250, a UI output device 260, and storage 240, which communicate with each other through a bus 290. The decoding apparatus 200 may further include a communication unit 220 coupled to a network 299.

The processing unit 210 may be a CPU or a semiconductor device for executing processing instructions stored in the memory 230 or the storage 240. The processing unit 210 may be at least one hardware processor.

The processing unit 210 may generate and process signals, data or information that are input to the decoding apparatus 200, are output from the decoding apparatus 1300, or are used in the decoding apparatus 200, and may perform examination, comparison, determination, etc. related to the signals, data or information. In other words, in embodiments, the generation and processing of data or information and examination, comparison and determination related to data or information may be performed by the processing unit 210.

Respective steps performed by the processing unit 210 may correspond to program modules. The program modules may be physically stored in various types of well-known storage devices. Further, at least some of the program modules may also be stored in a remote storage device that is capable of communicating with the decoding apparatus 200.

The program modules may include, but are not limited to, a routine, a subroutine, a program, an object, a component, and a data structure for performing functions or operations according to an embodiment or for implementing abstract data types according to an embodiment.

The program modules may be implemented using instructions or code executed by at least one processor of the decoding apparatus 200.

The storage unit may denote the memory 230 and/or the storage 240. Each of the memory 230 and the storage 240 may be any of various types of volatile or nonvolatile storage media. For example, the memory 230 may include at least one of Read Only Memory (ROM) 231 and Random Access Memory (RAM) 232.

The storage unit may store data or information used for the operation of the decoding apparatus 200. In an embodiment, the data or information of the decoding apparatus 200 may be stored in the storage unit.

For example, the storage unit may store a picture, a block, a list, motion information, inter-prediction information, a bitstream, etc.

The decoding apparatus 200 may be implemented in a computer system including a computer-readable storage medium.

The storage medium may store at least one module required for the operation of the decoding apparatus 200. The memory 230 may store at least one module, and may be configured such that the at least one module is executed by the processing unit 210.

Functions related to communication of the data or information of the decoding apparatus 200 may be performed through the communication unit 220.

For example, the communication unit 220 may receive a bitstream from the encoding apparatus 100.

Hereinafter, the term "encoder" may refer to the encoding apparatus 100. The term "decoder" may refer to the decoding apparatus 200.

Compression of Images and Videos Using Encoder Network and Decoder Network

Based on technology for compressing images and videos, data compression technology using a neural network has recently been developed.

These technologies may chiefly include an encoder network for extracting the features of input data (i.e., a feature extraction network) and a decoder network for reconstructing data from the extracted features (i.e., a reconstruction network).

A compression network may include the encoder network and the decoder network. As described above, the encoder network may be the encoding apparatus 100. The decoder network may be the decoding apparatus 200. The encoding apparatus 100 and the decoding apparatus 200 of the compression network may (physically) be a single device. Components having the same name in the encoding apparatus 100 and the decoding apparatus 200 may be a single component in a single apparatus.

The encoder network may generally include a downscaling process for performing a spatial simplification task. The downscaling process may be performed through a convolutional layer. Alternatively, the downscaling process may be performed through a separate scheme, such as sub-sampling or max-pooling.

The decoder network may perform upscaling so as to reconstruct an image having the original size thereof from data pertaining to extracted features. Such an upscaling process may be performed through the convolutional layer. Alternatively, the upscaling process may be performed through a separate upscaling scheme.

An existing compression network may change the size of an image to a suitable size by applying padding to the image depending on the ratios of downscaling and upscaling in the compression network so as to process data indicating images having various sizes. Here, the data may indicate an image. Alternatively, the data may be a video including multiple images.

In exemplary embodiments, data may comprise motion information and residual information. Alternatively, an image of the embodiments may comprises motion information and residual information. Alternatively, an image of the embodiments may be replaced with motion information and/or residual information. In other words, an target of compression may be motion information and/or residual information.

Figure 3:
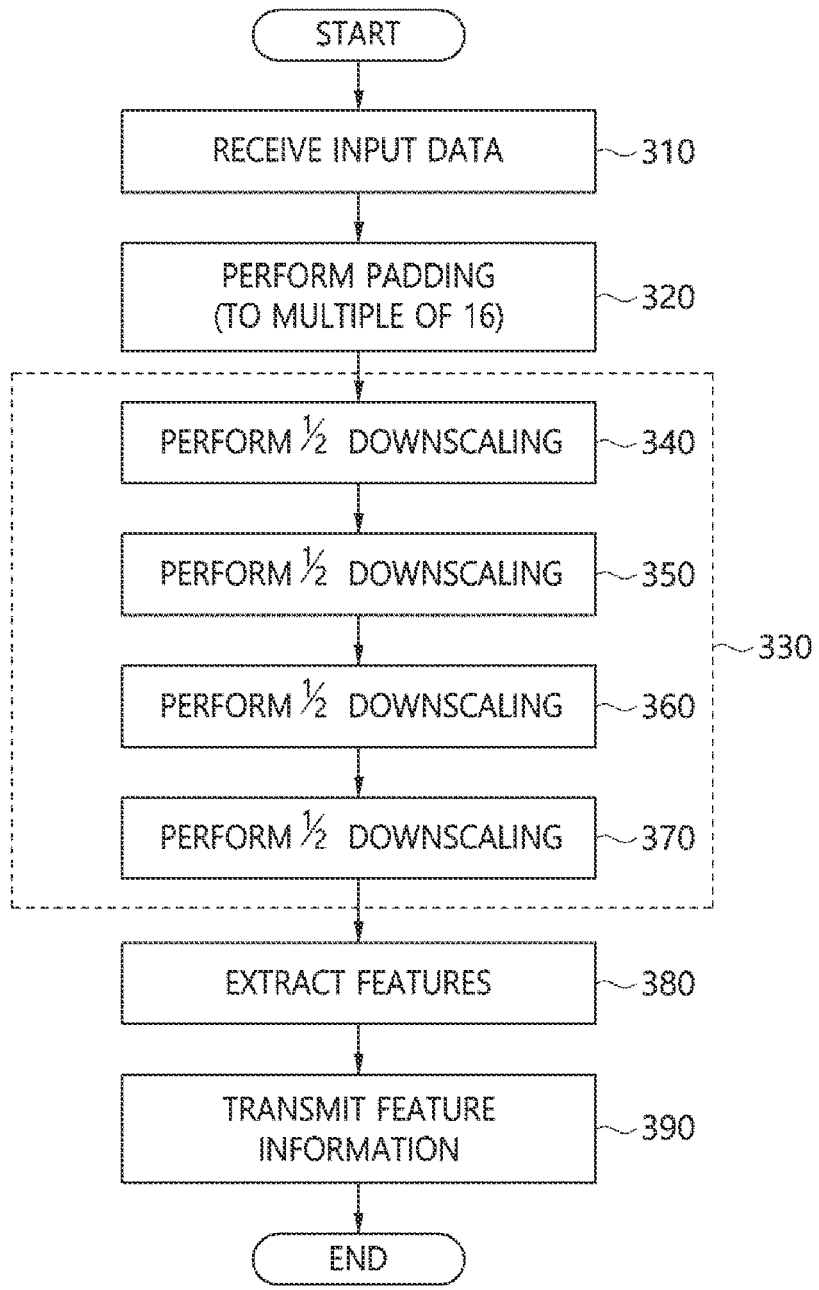
FIG. 3 is a flowchart of an encoding method using padding according to an embodiment.

FIG. 3 is a flowchart of an encoding method using padding according to an embodiment.

At step 310, the communication unit 120 of an encoding apparatus 100 may receive data. The data may indicate an image. Through the reception of the data, the encoding apparatus 100 may acquire input data.

At step 320, the processing unit 110 of the encoding apparatus 100 may perform padding on the data.

In an embodiment, padding may be an operation of adjusting the size of the image, which is represented by the data, to a multiple of $2^n$.

In an embodiment, padding may be an operation of inserting specific values into the image so that the size of the image is $2^n$. Padding may be an operation of adjusting the size of the image represented by the data to $2^n$ and inserting specific values into an area that is added through padding. The specific values may be "0".

In an embodiment, the size of the image may be the width and/or height of the image. The width and the height may be different from each other.

In an embodiment, n may be an integer equal to or greater than 1. In an embodiment, the case where n is 4 may be described. For example, padding may be an operation of adjusting the size of the image represented by the data to a multiple of 16.

At steps 330 and 380, the processing unit 110 may extract the features of the image by applying multiple downscaling operations to the padded image.

At steps 330, the processing unit 110 may generate a downscaled image by applying multiple downscaling operations to the padded image.

In an embodiment, the multiple downscaling operations may be four downscaling operations.

In an embodiment, each of the multiple downscaling operations may be configured to reduce the size of the image by half in a horizontal direction and reduce the size of the image by half in a vertical direction.

For example, four downscaling operations may reduce the size of the padded image to $\frac{1}{16}$ in a horizontal direction and reduce the size of the padded image to $\frac{1}{16}$ in a vertical direction.

In an embodiment, other elements of the compression neural network may be omitted. Based on compression technology, each of the multiple downscaling operations may include processing of a convolutional layer and/or nonlinear processing of the image in addition to image downscaling.

Below, an embodiment in which four downscaling operations are performed will be described by way of example.

Step 330 may include steps 340, 350, 360, and 370.

At step 340, the processing unit 110 may perform $\frac{1}{2}$ downscaling on the padded image.

For example, downscaling may reduce the width of the image by half and reduce the height of the image by half.

Downscaling at step 340 may be illustrated in brief. Downscaling at step 340 may include processing of a convolutional layer and/or nonlinear processing of the padded image.

At step 350, the processing unit 110 may perform downscaling on the padded image. A description of step 340 may also be applied to step 350. Repetitive descriptions will be omitted here.

At step 360, the processing unit 110 may perform downscaling on the padded image. The description of step 340 may also be applied to step 360. Repetitive descriptions will be omitted here.

At step 370, the processing unit 110 may perform downscaling on the padded image. The description of step 340 may also be applied to step 370. Repetitive descriptions will be omitted here.

At step 380, the processing unit 110 may extract features from a downscaled image.

At step 390, the communication unit 120 may transmit feature information indicating the extracted features to the decoding apparatus 200.

The feature information may include information about the original size of the image. The original size information may indicate the original size of the image before the image is padded.

Alternatively, at step 390, the communication unit 120 may transmit the original size information, together with the feature information, to the decoding apparatus 200.

Figure 4:
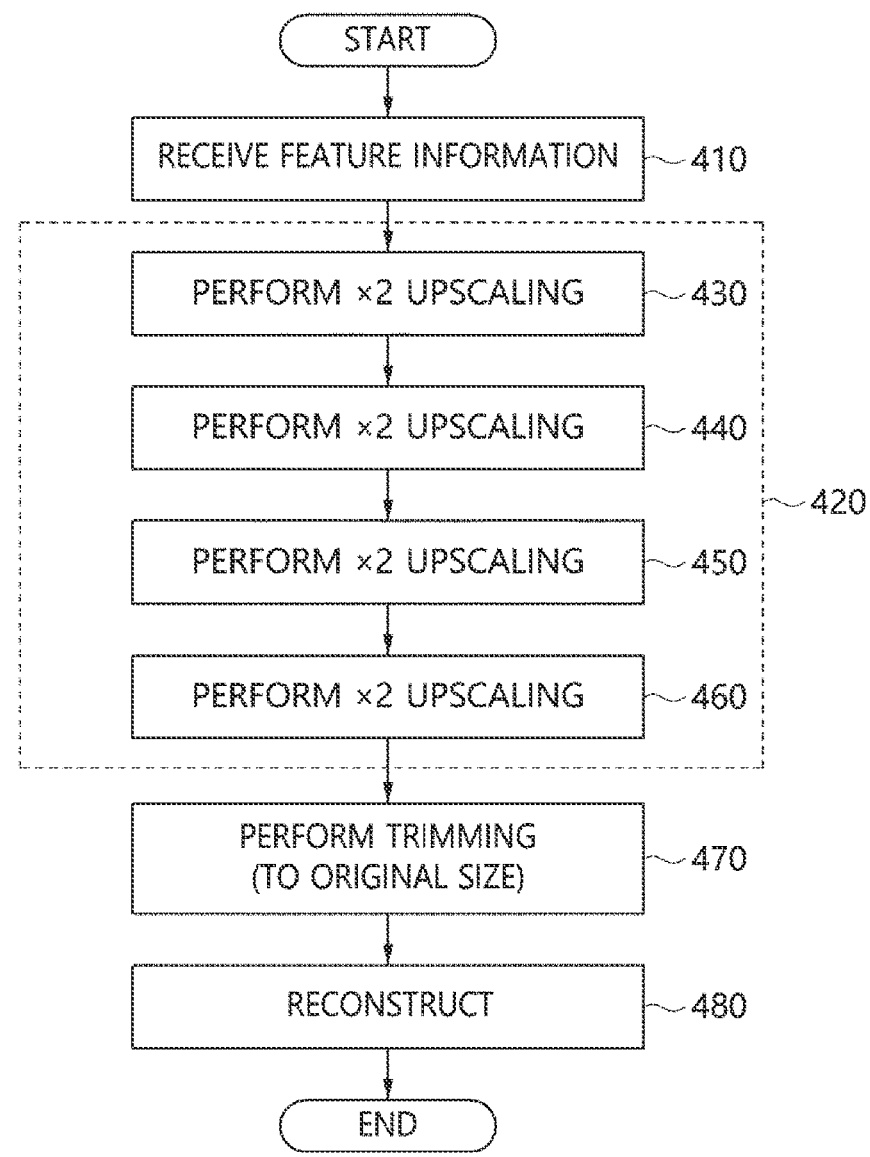
FIG. 4 is a flowchart of a decoding method using trimming according to an embodiment.

FIG. 4 is a flowchart of a decoding method using trimming according to an embodiment.

At step 410, the communication unit 220 of a decoding apparatus 200 may receive feature information about a padded image from the encoding apparatus 100.

The feature information may include information about the original size of the image. The original size information may indicate the original size of the image before padding is performed on the image by the encoding apparatus 100.

Alternatively, at step 410, the communication unit 220 may receive the original size information, together with the feature information, from the encoding apparatus 100.

At steps 420 and 470, the processing unit 210 of the decoding apparatus 200 may generate a reconstructed image by applying multiple upscaling operations to a downscaled image represented by the feature information.

At steps 420, the processing unit 210 may generate an upscaled image by applying multiple upscaling operations to the downscaled image.

In an embodiment, the multiple upscaling operations may be four upscaling operations.

In an embodiment, each of the multiple upscaling operations may double the size of the image (i.e., x2 upscaling) in a horizontal direction, and may double the size of the image in a vertical direction.

For example, the four upscaling operations may increase the size of the downscaled image 16 fold in a horizontal direction and 16 fold in a vertical direction.

In an embodiment, other elements of the compression neural network may be omitted. Based on compression technology, each of the multiple upscaling operations may include processing of a convolutional layer and/or nonlinear processing of the image, in addition to image upscaling.

Below, an embodiment in which four upscaling operations are performed will be described by way of example.

Step 420 may include steps 430, 440, 450, and 460.

At step 430, the processing unit 210 may perform upscaling on a downscaled image.

For example, upscaling may be configured to double the size of the image in a horizontal direction and double the size of the image in a vertical direction.

Upscaling at step 430 may be illustrated in brief. Upscaling at step 430 may include processing of a convolutional layer and/or nonlinear processing of the downscaled image.

At step 440, the processing unit 210 may perform upscaling on the downscaled image. A description of step 430 may also apply to step 440. Repetitive descriptions will be omitted here.

At step 450, the processing unit 210 may perform upscaling on the downscaled image. A description of step 430 may also apply to step 450. Repetitive descriptions will be omitted here.

At step 460, the processing unit 210 may perform upscaling on a downscaled image. A description of step 430 may also be applied to step 460. Repetitive descriptions will be omitted here.

At step 470, the processing unit 210 may generate an image having the original size by performing trimming on the upscaled image.

In an embodiment, trimming may be an operation of changing the size of the upscaled image, adjusted to a multiple of $2^n$ at step 320, to the size before the image is padded.

In an embodiment, trimming may be an operation of removing specific values inserted at step 320 so that the image has the original size. Trimming may be an operation of removing the specific values inserted into an area that is added due to padding at step 320 and adjusting the size of the upscaled image having a size of $2^n$ to the original size before the image is padded. The specific values may be "0".

In an embodiment, the size of the image may be the width and/or the height of the image. The width and the height may be different from each other.

In an embodiment, n may be an integer equal to or greater than 1. In an embodiment, the case where n is 4 may be described by way of example. For example, trimming may be an operation of adjusting the size of an image having a size of a multiple of 16 to the original size.

At step 480, the processing unit 210 may store or provide the image reconstructed through the above-described multiple upscaling and trimming operations.

In the compression network described above with reference to FIGS. 3 and 4, the encoding apparatus 100 may perform padding on the image represented by input data depending on the predefined ratio of downscaling and upscaling, and the decoding apparatus 200 may extract data corresponding to the image an original size by removing a padding area from the upscaled image.

For example, in the embodiments of FIGS. 3 and 4, the encoding apparatus 100 may apply padding to the image so that the image represented by the input data has a size of a multiple of 16, and the decoding apparatus 200 may remove the area generated due to the padding. Here, the original size of the image may be transmitted from the encoding apparatus 100 to the decoding apparatus 200 in the format of additional data.

Such a padding and trimming scheme may cause a problem in that, as the downscaling ratio by the encoding apparatus 100 increases, the size of a padding area also increases in proportion to the downscaling ratio.

Hereinafter, a method for reducing a padding area for an image represented by data will be described.

Figure 5:
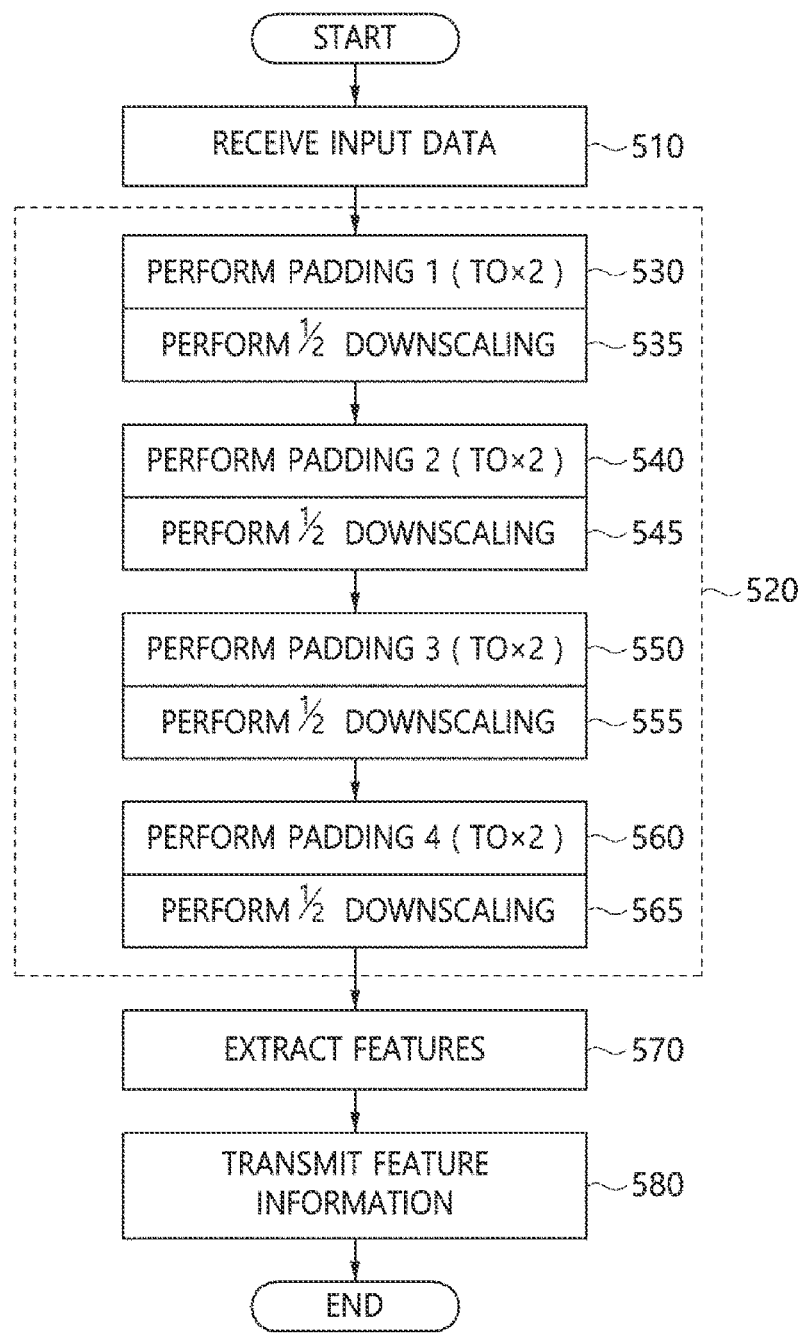
FIG. 5 is a flowchart of an encoding method using multiple padding operations and multiple downscaling operations according to an embodiment.

FIG. 5 is a flowchart of an encoding method using multiple padding operations and multiple downscaling operations according to an embodiment.

At step 510, the communication unit 120 of the encoding apparatus 100 may receive data. The data may indicate an image. Through the reception of the data, the encoding apparatus 100 may acquire the input data.

At steps 520 and 570, the processing unit 110 may extract the features of the image by applying multiple padding operations and multiple downscaling operations to the image represented by the data.

At step 520, the processing unit 110 may apply two or more padding and downscaling operations to the image represented by the data.

The processing unit 110 may apply padding to the image, and thereafter may apply downscaling to the image. In other words, the multiple padding operations and the multiple downscaling operations may be applied to the image in the order in which one padding operation is applied and thereafter one downscaling operation corresponding thereto is applied.

The multiple padding operations and the multiple downscaling operations may mean that pair(s) of padding and downscaling are performed a plurality of times.

m padding operations and m downscaling operations may be alternately performed on the image, m may be an integer equal to or greater than 2.

Here, a k-th padding operation and a k-th downscaling operation, among the m padding operations and downscaling operations, may correspond to each other. Depending on the downscaling ratio, the size of the image to which padding is to be applied and the area of the image to which padding is to be applied may be determined.

In an embodiment, in each of the multiple padding operations and each of the multiple downscaling operations, each padding operation on the image may be an operation of adjusting the size of the image to a multiple of n, and the ratio of downscaling corresponding to the padding operation may be 1/n.

The area to be added through padding corresponding to downscaling may be determined depending on the ratio of each downscaling operation.

For example, the ratio of each downscaling operation may be ½, and the padding of the image may be performed to adjust the width and the height of the image to a multiple of 2 depending on the ratio of downscaling.

Each padding operation on the image may be performed to adjust the size of the image to a minimum value equal to or greater than the current size of the image among multiples of n.

For example, the number of one or more lines that are added to the image through each of the multiple padding operations may be equal to or greater than 0 and less than or equal to n−1.

Alternatively, each padding operation on the image may be performed to adjust the size of the image to a multiple of 2, and the ratio of downscaling corresponding to the padding operation may be ½.

For example, the ratio of a first downscaling operation may be ½. Depending on the ratio of the first downscaling operation, the first padding operation may be performed such that each of the width and the height of the image is a multiple of 2.

Each padding operation may be an operation of inserting specific values into the image so that the size of the image is a multiple of n. Each padding operation may be an operation of adjusting the size of the image represented by the data to a multiple of n and inserting specific values into an area that is added through the corresponding padding operation. The specific values may be "0".

In an embodiment, the size of the image may be the width and/or the height of the image. The width and the height may be different from each other.

In an embodiment, n may be an integer equal to or greater than 2. In an embodiment, the case where n is 2 may be described. For example, each padding operation may be an operation of adjusting the size of the image, represented by the data, to a multiple of 2.

At step 520, the processing unit 110 may generate a downscaled image by applying multiple padding operations and multiple downscaling operations to the image.

In an embodiment, the multiple padding operations and the multiple downscaling operations may be four pairs of padding and downscaling operations.

In an embodiment, each of the multiple padding operations may increase the size of the image to a multiple of n. The processing unit 110 may determine whether the size of the image is a multiple of n. If it is determined that the size of the image is a multiple of n, the processing unit 110 may not apply padding to the image.

In an embodiment, each of the multiple downscaling operations may be intended to reduce the size of the image to 1/n in a horizontal direction and reduce the size of the image to 1/n in a vertical direction.

For example, each of the multiple padding operations may increase the size of the image to a multiple of 2. When the size of the image is already a multiple of 2, padding may not be applied. Each of the multiple downscaling operations may be intended to reduce the size of the image by half in a horizontal direction and reduce the size of the image by half in a vertical direction.

In an embodiment, other elements of the compression neural network may be omitted. Based on compression technology, each of the multiple downscaling operations may include processing of a convolutional layer and/or nonlinear processing of the image in addition to image downscaling.

In the following description, an embodiment in which n is 2 and four pairs of padding and downscaling operations are performed will be described by way of example.

Step 520 may include steps 530, 535, 540, 545, 550, 555, 560 and 565.

At step 530, the processing unit 110 may adjust the size of the image to a multiple of 2 by performing a first padding operation on the image.

For example, when the size of the image is already a multiple of 2, the processing unit 110 may skip the first padding operation on the image. When the size of the image is not a multiple of 2, the processing unit 110 may perform a first padding operation of adding one line to the image.

At step 535, the processing unit 110 may perform a first downscaling operation, corresponding to ½ downscaling, on the image to which the first padding operation is applied.

For example, the first downscaling operation may reduce the width of the image by half and the height of the image by half.

The first downscaling operation at step 535 may be illustrated in brief. The first downscaling operation at step 535 may include processing of a convolutional layer and/or nonlinear processing of the image.

At step 540, the processing unit 110 may adjust the size of the image by performing a second padding operation on the image.

At step 545, the processing unit 110 may perform a second downscaling operation on the image to which the second padding operation is applied.

A description of steps 530 and 535 may also be applied to steps 540 and 545. Repetitive descriptions will be omitted here.

At step 550, the processing unit 110 may adjust the size of the image by performing a third padding operation on the image.

At step 555, the processing unit 110 may perform a third downscaling operation on the image to which the third padding operation is applied.

A description of steps 530 and 535 may also be applied to steps 550 and 555. Repetitive descriptions will be omitted here.

At step 560, the processing unit 110 may adjust the size of the image by performing a fourth padding operation on the image.

At step 565, the processing unit 110 may perform a fourth downscaling operation on the image to which the fourth padding operation is applied.

A description of steps 530 and 535 may also be applied to steps 560 and 565. Repetitive descriptions will be omitted here.

At step 570, the processing unit 110 may extract features from the image to which the multiple padding operations and the multiple downscaling operations have been applied.

At step 580, the communication unit 120 may transmit feature information indicating the extracted features to the decoding apparatus 200.

The feature information may include original size information of the image. The original size information may indicate the original size of the image before the image is padded.

Further, at step 580, the communication unit 120 may transmit the original size information, together with the feature information, to the decoding apparatus 200.

The feature information may include the number-of-lines information indicating the numbers of one or more lines that are added through multiple padding operations. In other words, the number-of-lines information may indicate the number of lines that are added through each of multiple padding operations.

Alternatively, at step 580, the communication unit 120 may transmit the number-of-lines information, together with the feature information, to the decoding apparatus 200.

Figure 6:
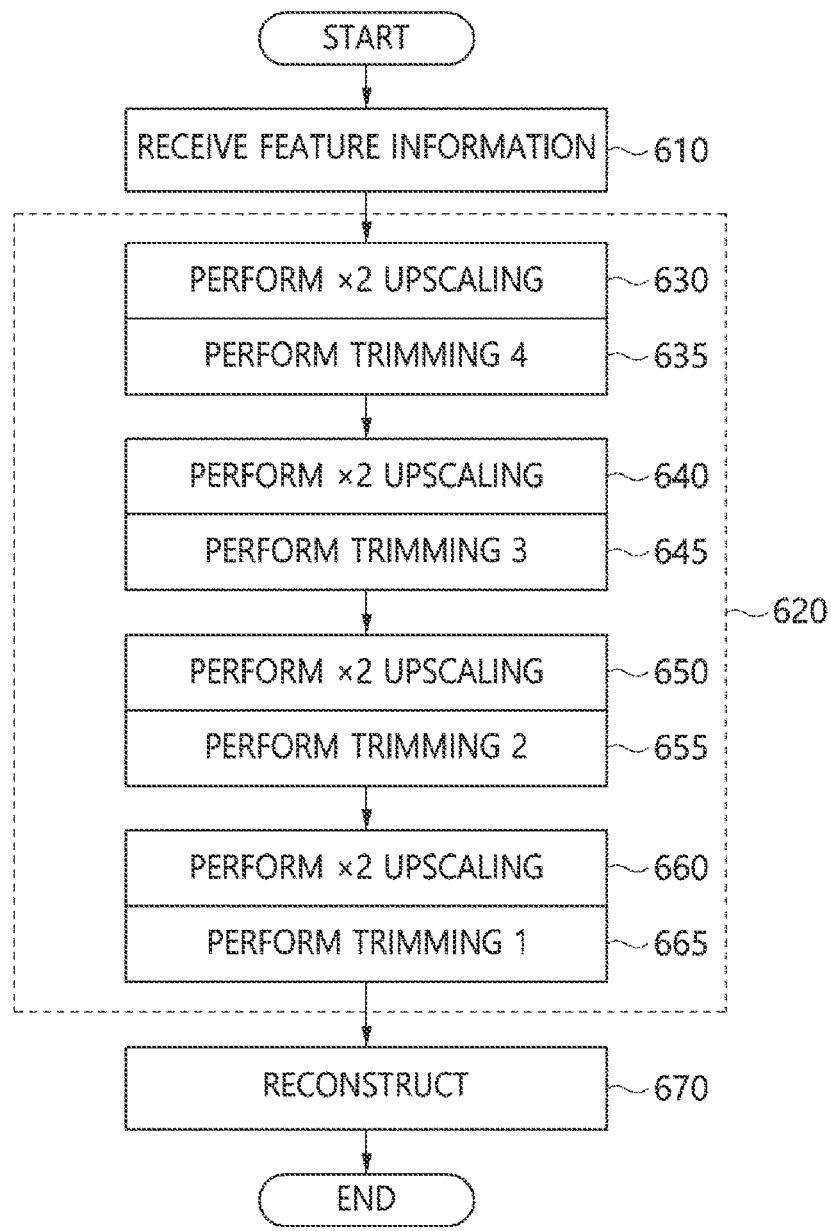
FIG. 6 is a flowchart of a decoding method using multiple upscaling operations and multiple trimming operations according to an embodiment.

FIG. 6 is a flowchart of a decoding method using multiple upscaling operations and multiple trimming operations according to an embodiment.

At step 610, the communication unit 220 of the decoding apparatus 200 may receive feature information about an image from the encoding apparatus 100.

The image represented by the feature information may be an image to which multiple padding operations and multiple downscaling operations are applied.

The feature information may include original size information of the image. The original size information may indicate the original size of the image before multiple padding operations and multiple downscaling operations are performed by the encoding apparatus 100.

Alternatively, at step 610, the communication unit 220 may receive original size information, together with the feature information, from the encoding apparatus 100.

The feature information may include the number-of-lines information indicating the number of one or more lines that are added through the multiple padding operations by the encoding apparatus 100.

Alternatively, at step 610, the communication unit 220 may receive the number-of-lines information, together with the feature information, from the encoding apparatus 100.

At steps 620, the processing unit 210 of the decoding apparatus 200 may generate an upscaled image by applying multiple upscaling operations and multiple trimming operations to the image represented by the feature information. The upscaled image may be a reconstructed image.

At step 620, the processing unit 210 may apply two or more upscaling and trimming operations to the image represented by the feature information.

The processing unit 210 may apply upscaling to the image, and thereafter may apply trimming to the image. In other words, multiple upscaling operations and multiple trimming operations may be applied to the image in the order in which one upscaling operation is applied and thereafter one trimming operation corresponding thereto is applied.

The multiple upscaling operations and the multiple trimming operations may mean that pairs of upscaling and trimming operations are performed a plurality of times.

Here, the number of pairs of multiple upscaling operations and multiple trimming operations may be identical to the number of pairs of multiple padding operations and multiple downscaling operations performed by the encoding apparatus 100.

The m upscaling operations and m trimming operations may be alternately performed on the image, m may be an integer equal to or greater than 2.

Each of the multiple upscaling operations may be performed to adjust the size of the image to n times.

In an embodiment, the size of the image may be the width and/or the height of the image. The width and the height may be different from each other.

Trimming on the image may be performed to remove, from the image, a number of lines identical to the number of lines that are added through a padding operation corresponding to the trimming operation, among the multiple padding operations performed by the encoding apparatus 100.

In an embodiment, in each of the multiple upscaling operations and each of the multiple trimming operations, each upscaling operation on the image may be performed to increase the size of the image to n times, and a trimming operation corresponding to the upscaling operation may be performed to remove one or more lines identical to the number of one or more lines that are added through a padding operation performed by the encoding apparatus 100, from the image to which the upscaling operation is applied.

The multiple padding operations performed by the encoding apparatus 100 and the multiple trimming operations performed by the decoding apparatus 200 may correspond to each other.

The encoding apparatus 100 may perform m padding operations, and the decoding apparatus 200 may perform m trimming operations to correspond to the number of padding operations. A padding operation performed in a k-th order, among the m padding operations, may correspond to a trimming operation performed in a (m−k+1)-th order, among the m trimming operations. Here, k may be equal to or greater than 1 and less than or equal to m. A k-th padding operation may denote padding performed in a k-th order, and a k-th trimming operation may denote trimming performed in a (m−k+1)-th order.

In the k-th padding operation and the k-th trimming operation which correspond to each other, the number of one or more lines that are added through the k-th padding operation may be identical to the number of one or more lines that are removed through the k-th trimming operation.

For example, the decoding apparatus 200 may determine the number of one or more lines that are to be removed through multiple trimming operations by utilizing the number of one or more lines that are added through the multiple padding operations, indicated by the number-of-lines information, in reverse order.

In other words, the encoding apparatus 100 may transmit the number-of-lines information indicating the number of one or more lines that are added through a k-th padding operation, among the multiple padding operations, to the decoding apparatus 200. The decoding apparatus 200 may determine the number of one or more lines that are to be removed through a (m−k+1)-th trimming operation corresponding to the k-th padding operation, using the number-of-lines information.

For example, the number of line(s) to be removed from the image through each of the multiple trimming operations may be equal to or greater than 0 and less than or equal to n−1.

For example, each trimming operation performed on the image may be performed to adjust the size of the image to a multiple of 2.

In an embodiment, the size of the image may be the width and/or the height of the image. The width and the height may be different from each other.

In an embodiment, n may be an integer equal to or greater than 2. In an embodiment, the case where n is 2 may be described. For example, each upscaling operation may be an operation of doubling the size of the image represented by data.

In the following description, an embodiment in which n is 2 and four pairs of upscaling and trimming operations are performed will be described by way of example.

Step 620 may include steps 630, 635, 640, 645, 650, 655, 660 and 665.

At step 630, the processing unit 210 may double the size of the image by performing a fourth upscaling operation on the image. The fourth upscaling operation may correspond to a fourth downscaling operation performed by the encoding apparatus 100.

At step 635, the processing unit 210 may perform a fourth trimming operation on the image to which the fourth upscaling operation is applied.

Here, the number of one or more lines that are removed through the fourth trimming operation may be identical to the number of one or more lines that are inserted through the fourth padding operation by the encoding apparatus 100.

In other words, the encoding apparatus 100 may perform m padding operations, and the decoding apparatus 200 may perform m trimming operations to correspond to the number of padding operations. The one or more lines that are added through the k-th padding operation by the encoding apparatus 100 may be removed through the k-th trimming operation by the decoding apparatus 200.

Here, the k-th padding operation performed by the encoding apparatus 100 may be a padding operation performed in a k-th order, among the multiple padding operations by the encoding apparatus 100. The k-th trimming operation performed by the decoding apparatus 200 may be a trimming operation performed in a (m−k+1)-th order, among the multiple trimming operations performed by the decoding apparatus 200. That is, the multiple padding operations performed by the encoding apparatus 100 and the multiple trimming operations performed by the decoding apparatus 200 may correspond to each other in reverse order.

The processing unit 210 may determine the number of one or more lines to be removed through the k-th trimming operation using the number-of-lines information.

At step 640, the processing unit 210 may double the size of the image by performing a third upscaling operation on the image. The third upscaling operation may correspond to the third downscaling operation performed by the encoding apparatus 100.

At step 645, the processing unit 210 may perform a third trimming operation on the image to which the third upscaling operation is applied.

Here, the number of one or more lines that are removed through the third trimming operation may be identical to the number of one or more lines that are inserted through the third padding operation by the encoding apparatus 100.

A description of steps 630 and 635 may also be applied to steps 640 and 645. Repetitive descriptions will be omitted here.

At step 650, the processing unit 210 may double the size of the image by performing a second upscaling operation on the image. The second upscaling operation may correspond to the second downscaling operation performed by the encoding apparatus 100.

At step 655, the processing unit 210 may perform a second trimming operation on the image to which the second upscaling operation is applied.

Here, the number of one or more lines that are removed through the second trimming operation may be identical to the number of one or more lines that are inserted through the second padding operation by the encoding apparatus 100.

A description of steps 630 and 635 may also be applied to steps 650 and 655. Repetitive descriptions will be omitted here.

At step 660, the processing unit 210 may double the size of the image by performing a first upscaling operation on the image. The first upscaling operation may correspond to the first downscaling operation performed by the encoding apparatus 100.

At step 655, the processing unit 210 may perform a first trimming operation on the image to which the first upscaling operation is applied.

Here, the number of one or more lines that are removed through the first trimming operation may be identical to the number of one or more lines that are inserted through the first padding operation by the encoding apparatus 100.

A description of steps 630 and 635 may also be applied to steps 660 and 665. Repetitive descriptions will be omitted here.

At step 670, the processing unit 210 may store or provide the image reconstructed through the above-described multiple upscaling and trimming operations.

When padding operations and trimming operations are performed on the image represented by input data based on the methods described above with reference to FIGS. 5 and 6, the size of the area to be added through the multiple padding operations may be decreased.

As described above, the ratio of downscaling may be ½, and padding corresponding to downscaling may be performed such that each of the width and the height of an image is a multiple of 2 depending on the ratio of downscaling.

By means of this padding, the maximum padding area with respect to a horizontal axis may be one line, and the maximum padding area with respect to a vertical axis may be one line. In the embodiment described above with reference to FIG. 3, the maximum padding area with respect to a horizontal axis may be 15 lines, and the maximum padding area with respect to a vertical axis may be 15 lines. Considering the embodiment described above with reference to FIG. 3, in the embodiment described above with reference to FIG. 5, the padding area may be greatly decreased.

In detail, in the embodiment described above with reference to FIG. 3, padding has been performed on the image in consideration of the multiplication of the ratios of all downscaling operations performed by the encoding apparatus 100, whereas in the embodiment described above with reference to FIG. 5, a padding operation corresponding to each downscaling operation may be performed depending on the ratio of each of multiple downscaling operations.

In an embodiment, instead of transmitting information about the number of one or more lines that are added through multiple padding operations, the processing unit 210 of the decoding apparatus 200 may determine the number of one or more lines to be removed through multiple trimming operations using a specific scheme.

For example, the number of one or more lines to be removed through the multiple trimming operations may be determined by the following Equations (1), (2), (3), and (4):

$$\text{input\_size}_1 = \text{size of image represented by input data} \quad (1)$$

Here, $\text{input\_size}_1$ may be the size of an image that is input to a first padding operation at step 530.

$$(\text{when } k>1) \ \text{input\_size}_k = \text{padded\_size}_{(k-1)}/2 \quad (2)$$

$\text{input\_size}_k$ may be the size of the image that is input to a k-th padding operation.

Here, $\text{padded\_size}_k$ may be the size of the image to which the k-th padding is applied.

$$\text{padded\_size}_k = \text{ceil}(\text{input\_size}k/2)*2 \quad (3)$$

ceil(x) may be a minimum value, among integers of x or more.

$$\text{pad\_size}_k = \text{padded\_size}_k - \text{input\_size}_k \quad (4)$$

$\text{pad\_size}_k$ may denote the size of an area that is added through the k-th padding operation. In the k-th trimming operation corresponding to the k-th padding operation, removal of an area identical to the size added in the k-th padding operation may be performed in the k-th trimming operation.

The embodiments described above with reference to FIGS. 5 and 6 may be extended to have various downscaling ratios and upscaling ratios.

Below, methods in which the numbers of one or more lines that are added through multiple padding operations are different from each other will be described.

Figure 7:
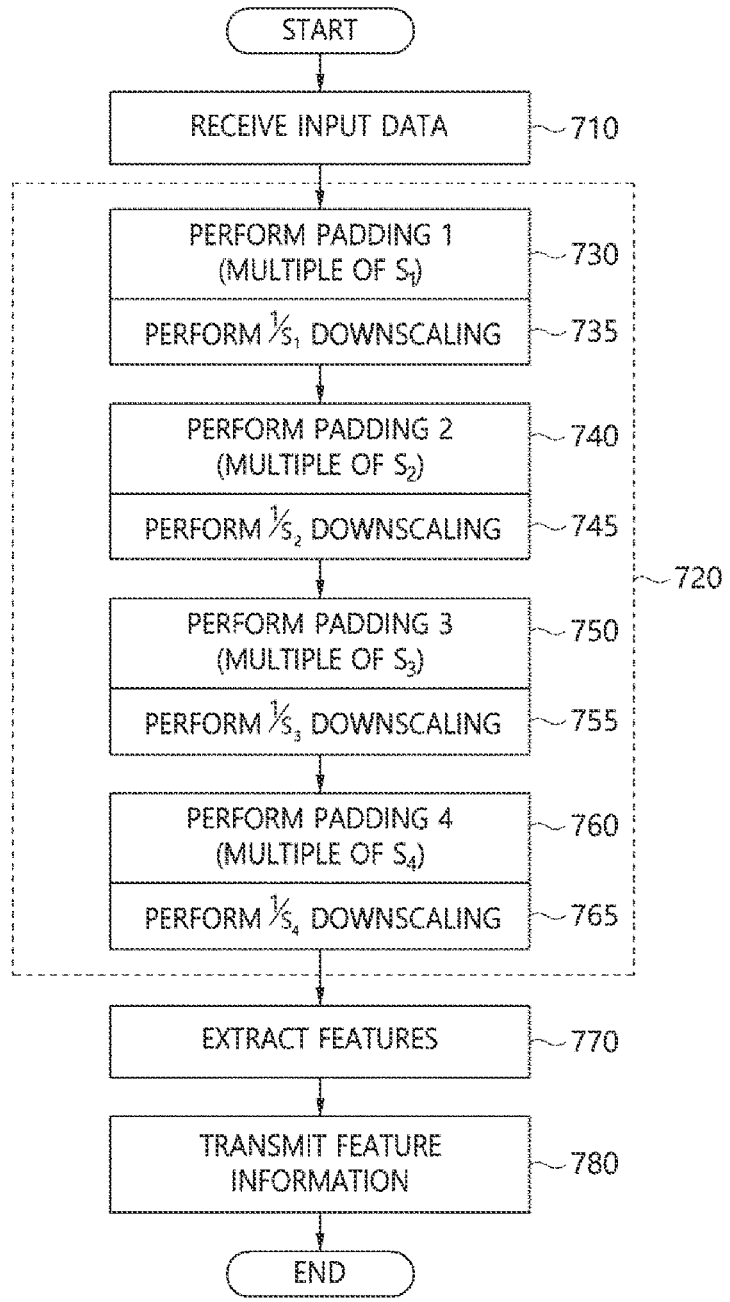
FIG. 7 is a flowchart of an encoding method using multiple padding operations and multiple downscaling operations according to an embodiment.

FIG. 7 is a flowchart of an encoding method using multiple padding operations and multiple downscaling operations according to an embodiment.

At step 710, the communication unit 120 of the encoding apparatus 100 may receive data. The data may indicate an image. Through the reception of the data, the encoding apparatus 100 may acquire the input data.

At steps 720 and 770, the processing unit 110 may extract the features of the image by applying multiple padding operations and multiple downscaling operations to the image represented by the data.

The ratios of multiple downscaling operations may be different from each other, and thus the ranges of one or more lines that can be added through the multiple padding operations may be different from each other.

At step 720, the processing unit 110 may apply two or more padding and downscaling operations to the image represented by the data.

The processing unit 110 may apply padding to the image, and thereafter may apply downscaling to the image. In other words, the multiple padding operations and the multiple downscaling operations may be applied to the image in the order in which one padding operation is applied and thereafter one downscaling operation corresponding thereto is applied.

The multiple padding operations and the multiple downscaling operations may mean that pairs of padding and downscaling operations are performed a plurality of times.

m padding operations and m downscaling operations may be alternately performed on the image, m may be an integer equal to or greater than 2.

Here, a k-th padding operation and a k-th downscaling operation, among the m padding operations and downscaling operations, may correspond to each other. Depending on the downscaling ratio, the size of an image to which padding is applied and an area of the image to which padding is to be applied may be determined. Here, k may be an integer that is equal to or greater than 1 and less than or equal to m.

In an embodiment, in each of the multiple padding operations and each of the multiple downscaling operations, a k-th padding operation on the image may be an operation of adjusting the size of the image to a multiple of $S_k$, and the ratio of a k-th downscaling operation corresponding to the k-th padding operation may be $1/S_k$.

An area to be added through the k-th padding operation corresponding to the k-th downscaling operation may be determined depending on the ratio of the k-th downscaling operation.

For example, the ratio of the k-th downscaling operation may be $1/S_k$, and the k-th padding operation on the image may be performed to adjust the width and the height of the image to a multiple of $S_k$ depending on the ratio of the k-th downscaling operation.

By means of the k-th padding operation, a minimum of 0 line to a maximum of $S_k - 1$ lines may be added to the image. In other words, the maximum number of lines that are added to the image through the k-th padding operation may be reduced to $S_k - 1$.

The k-th padding operation on the image may be performed to adjust the size of the image to a minimum value equal to or greater than the current size of the image among multiples of $S_k$.

For example, the number of one or more lines that are added to the image through the k-th padding operation, among the multiple padding operations, may be equal to or greater than 0 and less than or equal to $S_k - 1$.

Alternatively, the k-th padding operation on the image may be performed to adjust the size of the image to a multiple of $S_k$, and the ratio of the k-th downscaling operation corresponding to the k-th padding operation may be $1/S_k$.

The k-th padding operation may be an operation of inserting specific values into the image so that the size of the image is a multiple of n. The k-th padding operation may be an operation of adjusting the size of the image represented by the data to a multiple of $S_k$ and inserting specific values into an area that is added through the k-th padding operation. The specific values may be '0'.

In an embodiment, the size of the image may be the width and/or the height of the image. The width and the height may be different from each other.

At step 720, the processing unit 110 may generate a downscaled image by applying multiple padding operations and multiple downscaling operations to the image.

In an embodiment, the multiple padding operations and multiple downscaling operations may be four pairs of padding and downscaling operations.

In an embodiment, the k-th padding operation, among the multiple padding operations, may increase the size of the image to a multiple of $S_k$. The processing unit 110 may determine whether the size of the image is a multiple of $S_k$. If it is determined that the size of the image is already a multiple of $S_k$, the processing unit 110 may not apply the k-th padding operation to the image.

In an embodiment, the k-th downscaling operation, among the multiple downscaling operations, may be intended to reduce the size of the image to $1/S_k$ in a horizontal direction and reduce the size of the image to $1/S_k$ in a vertical direction.

In an embodiment, other elements of the compression neural network may be omitted. Based on compression technology, each of the multiple downscaling operations may include processing of a convolutional layer and/or nonlinear processing of the image in addition to image downscaling.

In the following description, an embodiment in which four pairs of padding and downscaling operations are performed will be described by way of example.

Step 720 may include steps 730, 735, 740, 745, 750, 755, 760 and 765.

At step 730, the processing unit 110 may adjust the size of the image to a multiple of $S_1$ by performing a first padding operation on the image.

For example, when the size of the image is already a multiple of $S_1$, the processing unit 110 may skip the first padding operation on the image. When the size of the image is not a multiple of $S_1$, the processing unit 110 may adjust the size of the image to a multiple of $S_1$ by performing a first padding operation of adding one or more lines to the image.

At step 735, the processing unit 110 may perform a first downscaling operation corresponding to $1/S_1$ on the image to which the first padding operation is applied.

For example, the first downscaling operation may reduce the width of the image to $1/S_1$ and the height of the image to $1/S_1$.

The first downscaling operation at step 735 may be illustrated in brief. The first downscaling operation at step 735 may include processing of a convolutional layer and/or nonlinear processing of the image.

At step 740, the processing unit 110 may adjust the size of the image to a multiple of $S_2$ by performing a second padding operation on the image.

For example, when the size of the image is already a multiple of $S_2$, the processing unit 110 may skip the second padding operation on the image. When the size of the image is not a multiple of $S_2$, the processing unit 110 may adjust the size of the image to a multiple of $S_2$ by performing a second padding operation of adding one or more lines to the image.

At step 745, the processing unit 110 may perform a second downscaling operation corresponding to $1/S_2$ on the image to which the second padding operation is applied.

For example, the second downscaling operation may reduce the width of the image to $1/S_2$ and the height of the image to $1/S_2$.

The second downscaling operation at step 745 may be illustrated in brief. The second downscaling operation at step 745 may include processing of a convolutional layer and/or nonlinear processing of the image.

At step 750, the processing unit 110 may adjust the size of the image to a multiple of $S_3$ by performing a third padding operation on the image.

For example, when the size of the image is already a multiple of $S_3$, the processing unit 110 may skip the third padding operation on the image. When the size of the image is not a multiple of $S_3$, the processing unit 110 may adjust the size of the image to a multiple of $S_3$ by performing a third padding operation of adding one or more lines to the image.

At step 755, the processing unit 110 may perform a third downscaling operation corresponding to $1/S_3$ on the image to which the third padding operation is applied.

For example, the third downscaling operation may reduce the width of the image to $1/S_3$ and the height of the image to $1/S_3$.

The third downscaling operation at step 755 may be illustrated in brief. The third downscaling operation at step 755 may include processing of a convolutional layer and/or nonlinear processing of the image.

At step 760, the processing unit 110 may adjust the size of the image to a multiple of $S_4$ by performing a fourth padding operation on the image.

For example, when the size of the image is already a multiple of $S_4$, the processing unit 110 may skip the fourth padding operation on the image. When the size of the image is not a multiple of $S_4$, the processing unit 110 may adjust the size of the image to a multiple of $S_4$ by performing a fourth padding operation of adding one or more lines to the image.

At step 765, the processing unit 110 may perform a fourth downscaling operation corresponding to $1/S_4$ on the image to which the fourth padding operation is applied.

For example, the fourth downscaling operation may reduce the width of the image to $1/S_4$ and the height of the image to $1/S_4$.

The fourth downscaling operation at step 765 may be illustrated in brief. The fourth downscaling operation at step 765 may include processing of a convolutional layer and/or nonlinear processing of the image.

At step 770, the processing unit 110 may extract features from the image to which multiple padding operations and multiple downscaling operations have been applied.

At step 780, the communication unit 120 may transmit feature information indicating the extracted features to the decoding apparatus 200.

The feature information may include original size information of the image. The original size information may indicate the original size of the image before the image is padded.

Alternatively, at step 780, the communication unit 120 may transmit the original size information, together with the feature information, to the decoding apparatus 200.

The feature information may include the number-of-lines information indicating the number of one or more lines that are added through multiple padding operations. In other words, the number-of-lines information may indicate the number of line(s) that are added through each of multiple padding operations.

Alternatively, at step 780, the communication unit 120 may transmit the number-of-lines information, together with the feature information, to the decoding apparatus 200.

The feature information may include ratio information. The feature information may include the ratios of multiple downscaling operations. Alternatively, the feature information may include reciprocals of the ratios of multiple downscaling operations.

For example, the ratio information may include $S_1$ to $S_m$. Alternatively, the ratio information may include/$S_1$ to $1/S_m$.

Alternatively, at step 780, the communication unit 120 may transmit the ratio information, together with the feature information, to the decoding apparatus 200.

Figure 8:
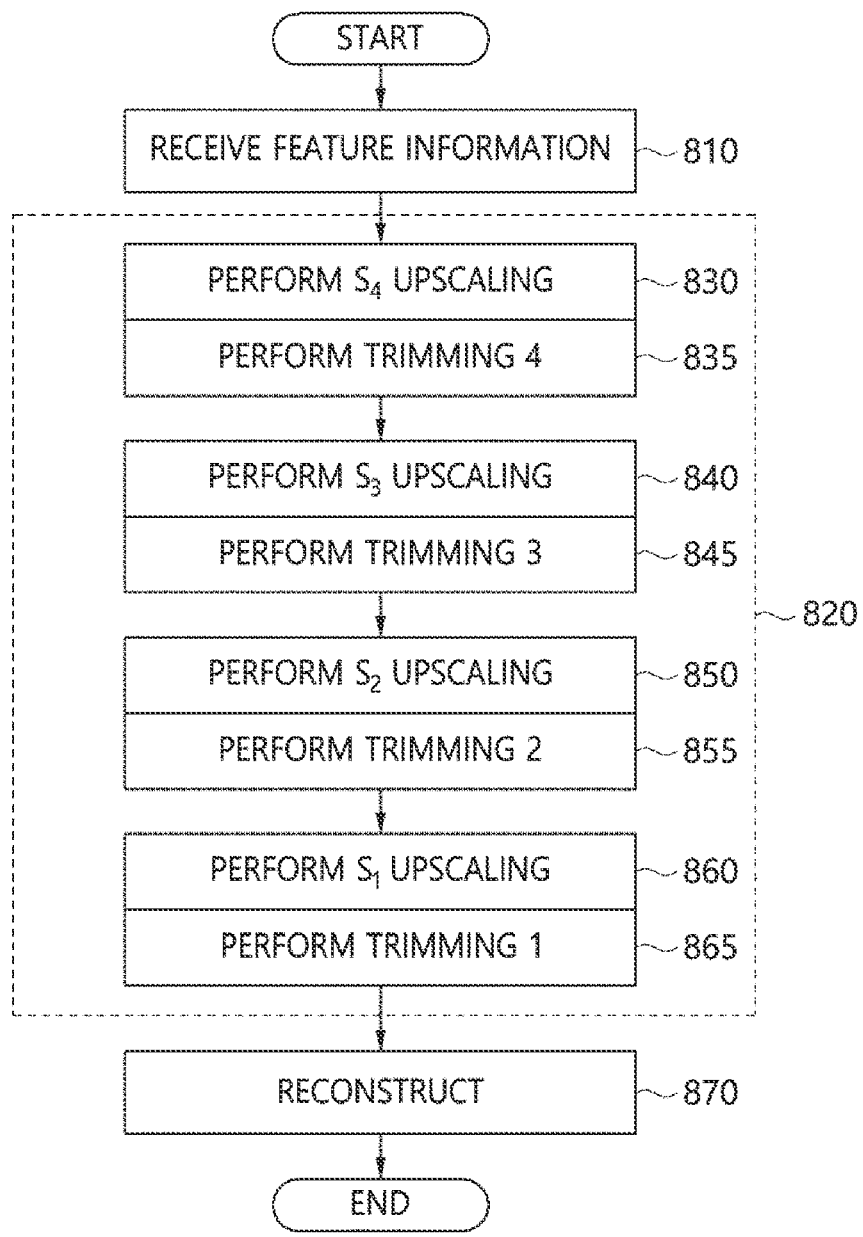
FIG. 8 is a flowchart of a decoding method using multiple upscaling operations and multiple trimming operations according to an embodiment.

FIG. 8 is a flowchart of a decoding method using multiple upscaling operations and multiple trimming operations according to an embodiment.

At step 810, the communication unit 220 of the decoding apparatus 200 may receive feature information about a padded image from the encoding apparatus 100.

The image represented by the feature information may be an image to which multiple padding operations and multiple downscaling operations are applied.

The feature information may include original size information of the image. The original size information may indicate the original size of the image before multiple padding operations and multiple downscaling operations are performed by the encoding apparatus 100.

Alternatively, at step 810, the communication unit 220 may receive the original size information, together with the feature information, from the encoding apparatus 100.

The feature information may include the number-of-lines information indicating the number of one or more lines that are added through the multiple padding operations by the encoding apparatus 100.

Alternatively, at step 810, the communication unit 220 may receive the number-of-lines information, together with the feature information, from the encoding apparatus 100.

The feature information may include ratio information. The ratio information may include the ratios of multiple downscaling operations performed by the encoding apparatus 100. Alternatively, the ratio information may include reciprocals of the ratios of multiple downscaling operations performed by the encoding apparatus 100.

For example, the ratio information may include $S_1$ to $S_m$. Alternatively, the ratio information may include $1/S_1$ to $1/S_m$.

Here, m may be the number of multiple downscaling operations.

Alternatively, at step 810, the communication unit 220 may receive the ratio information, together with the feature information, from the encoding apparatus 100.

At steps 820, the processing unit 210 of the decoding apparatus 200 may generate an upscaled image by applying multiple upscaling operations and multiple trimming operations to the image represented by the feature information. The upscaled image may be a reconstructed image.

At step 820, the processing unit 210 may apply two or more upscaling and trimming operations to the image represented by the feature information.

The processing unit 210 may apply upscaling to the image, and thereafter may apply trimming to the image. In other words, multiple upscaling operations and multiple trimming operations may be applied to the image in the order in which one upscaling operation is applied and thereafter one trimming operation corresponding thereto is applied.

The multiple upscaling operations and the multiple trimming operations may mean that pairs of upscaling and trimming operations are performed a plurality of times.

Here, the number of pairs of multiple upscaling operations and multiple trimming operations may be identical to the number of pairs of multiple padding operations and multiple downscaling operations performed by the encoding apparatus 100.

The m upscaling operations and m trimming operations may be alternately performed on the image, m may be an integer equal to or greater than 2.

A k-th upscaling operation, among the multiple upscaling operations, may be performed to adjust the size of the image to $S_k$ times. Here, k may be an integer that is equal to or greater than 1 and less than or equal to m.

The processing unit 210 may determine $S_k$ using the ratio information.

In an embodiment, the size of the image may be the width and/or the height of the image. The width and the height may be different from each other.

A k-th trimming operation on the image, among the multiple trimming operations, may be performed to remove, from the image, a number of lines identical to the number of lines that are added through the k-th padding operation corresponding to the k-th trimming operation, among the multiple padding operations performed by the encoding apparatus 100.

In an embodiment, in each of the multiple upscaling operations and each of the multiple trimming operations, a k-th upscaling operation on the image may be performed to increase the size of the image to $S_k$ times, and a k-th trimming operation corresponding to the k-th upscaling operation may be performed to remove one or more lines identical to the number of one or more lines that are added through a k-th padding operation, performed by the encoding apparatus 100, from the image to which the k-th upscaling operation is applied.

The multiple padding operations performed by the encoding apparatus 100 and the multiple trimming operations performed by the decoding apparatus 200 may correspond to each other.

The encoding apparatus 100 may perform m padding operations, and the decoding apparatus 200 may perform m trimming operations corresponding to the number of padding operations. A padding operation performed in a k-th order, among the m padding operations, may correspond to a trimming operation performed in a (m−k+1)-th order, among the m trimming operations. Here, k may be equal to or greater than 1 and less than or equal to m. The k-th padding operation may denote padding performed in a k-th order, and the k-th trimming operation may denote trimming performed in a (m−k+1)-th order.

In the k-th padding operation and the k-th trimming operation which correspond to each other, the number of one or more lines that are added through the k-th padding operation may be identical to the number of one or more lines that are removed through the k-th trimming operation.

For example, the decoding apparatus 200 may determine the number of one or more lines that are to be removed through multiple trimming operations by utilizing the number of one or more lines that are added through the multiple padding operations, indicated by the number-of-lines information, in reverse order.

In other words, the encoding apparatus 100 may transmit the number-of-lines information indicating the number of one or more lines that are added through a k-th padding operation, among the multiple padding operations, to the decoding apparatus 200. The decoding apparatus 200 may determine the number of one or more lines that are to be removed through a (m−k+1)-th trimming operation corresponding to the k-th padding operation, using the number-of-lines information.

For example, the number of line(s) to be removed from the image through the k-th trimming operation, among the multiple trimming operations, may be equal to or greater than 0 and less than or equal to $S_k-1$.

For example, the k-th trimming operation performed on the image may be performed to adjust the size of the image to a multiple of $S_k$.

In an embodiment, the size of the image may be the width and/or the height of the image. The width and the height may be different from each other.

In an embodiment, $S_k$ may be an integer equal to or greater than 2.

Below, an embodiment in which four pairs of upscaling and trimming operations are performed will be described by way of example.

Step 820 may include steps 830, 835, 840, 845, 850, 855, 860 and 865.

At step 830, the processing unit 210 may increase the size of the image to $S_4$ times by performing a fourth upscaling operation on the image. The fourth upscaling operation may correspond to the fourth downscaling operation performed by the encoding apparatus 100.

At step 835, the processing unit 210 may perform a fourth trimming operation on the image to which the fourth upscaling operation is applied.

Here, the number of one or more lines that are removed through the fourth trimming operation may be identical to the number of one or more lines that are inserted through the fourth padding operation by the encoding apparatus 100.

In other words, the encoding apparatus 100 may perform m padding operations, and the decoding apparatus 200 may perform m trimming operations corresponding to the number of padding operations. The one or more lines that are added through the k-th padding operation by the encoding apparatus 100 may be removed through the k-th trimming operation by the decoding apparatus 200.

Here, the k-th padding operation performed by the encoding apparatus 100 may be a padding operation performed in a k-th order, among the multiple padding operations by the encoding apparatus 100. The k-th trimming operation performed by the decoding apparatus 200 may be a trimming operation performed in a (m−k+1)-th order, among the multiple trimming operations performed by the decoding apparatus 200. That is, the multiple padding operations performed by the encoding apparatus 100 and the multiple trimming operations performed by the decoding apparatus 200 may correspond to each other in reverse order.

The processing unit 210 may determine the number of one or more lines to be removed through the k-th trimming operation using the number-of-lines information.

At step 840, the processing unit 210 may increase the size of the image to $S_3$ times by performing a third upscaling operation on the image. The third upscaling operation may correspond to the third downscaling operation performed by the encoding apparatus 100.

At step 845, the processing unit 210 may perform a third trimming operation on the image to which the third upscaling operation is applied.

Here, the number of one or more lines that are removed through the third trimming operation may be identical to the number of one or more lines that are inserted through the third padding operation by the encoding apparatus 100.

A description of steps 830 and 835 may also be applied to steps 840 and 845. Repetitive descriptions will be omitted here.

At step 850, the processing unit 210 may increase the size of the image to $S_2$ times by performing a second upscaling operation on the image. The second upscaling operation may correspond to the second downscaling operation performed by the encoding apparatus 100.

At step 855, the processing unit 210 may perform a second trimming operation on the image to which the second upscaling operation is applied.

Here, the number of one or more lines that are removed through the second trimming operation may be identical to the number of one or more lines that are inserted through the second padding operation by the encoding apparatus 100.

A description of steps 830 and 835 may also be applied to steps 850 and 855. Repetitive descriptions will be omitted here.

At step 860, the processing unit 210 may increase the size of the image to $S_1$ times by performing a first upscaling operation on the image. The first upscaling operation may correspond to the first downscaling operation performed by the encoding apparatus 100.

At step 855, the processing unit 210 may perform a first trimming operation on the image to which the first upscaling operation is applied.

Here, the number of one or more lines that are removed through the first trimming operation may be identical to the number of one or more lines that are inserted through the first padding operation by the encoding apparatus 100.

A description of steps 830 and 835 may also be applied to steps 860 and 865. Repetitive descriptions will be omitted here.

At step 870, the processing unit 210 may store or provide the image reconstructed through the above-described multiple upscaling and trimming operations.

When padding operations and trimming operations are performed on the image represented by input data based on the methods described above with reference to FIGS. 7 and 8, the size of the area to be added through the multiple padding operations may be decreased.

As described above, the ratios of the multiple downscaling operations may be different from each other, and padding operations corresponding to the downscaling operations may be performed depending on the ratios of the downscaling operations.

By means of the k-th padding operation, the maximum padding area with respect to a horizontal axis may be $S_k$ line(s), and the maximum padding area with respect to a vertical axis may be $S_k$ line(s). In the embodiment described above with reference to FIG. 3, the maximum padding area with respect to a horizontal axis may be 15 lines, and the maximum padding area with respect to a vertical axis may be 15 lines. Considering the embodiment described above with reference to FIG. 3, in the embodiment described above with reference to FIG. 7, the padding area may be greatly decreased.

In detail, in the embodiment described above with reference to FIG. 3, padding has been performed on the image in consideration of the multiplication of the ratios of all downscaling operations performed by the encoding apparatus 100, whereas in the embodiment described above with reference to FIG. 7, a padding operation corresponding to each downscaling operation may be performed depending on the ratio of each of multiple downscaling operations.

In an embodiment, instead of transmitting information about the number of one or more lines that are added through multiple padding operations, the processing unit 210 of the decoding apparatus 200 may determine the number of one or more lines to be removed through multiple trimming operations using a specific scheme.

For example, the number of one or more lines to be removed through the multiple trimming operations may be determined by the following Equations (5), (6), (7), and (8):

$$\text{input\_size}_1 = \text{size of image represented by input data} \quad (5)$$

Here, $\text{input\_size}_1$ may be the size of an image that is input to a first padding operation at step 730.

$$(\text{when } k>1) \; \text{input\_size}_k = \text{padded\_size}_{(k-1)}/S_{k-1} \quad (6)$$

$\text{input\_size}_k$ may be the size of the image that is input to a k-th padding operation.

Here, $\text{padded\_size}_k$ may be the size of an image to which the k-th padding is applied.

$$\text{padded\_size}_k = \text{ceil}(\text{input\_size}_k/2) * S_{k-1} \quad (7)$$

ceil(x) may be a minimum value, among integers of x or more.

$$\text{pad\_size}_k = \text{padded\_size}_k - \text{input\_size}_k \quad (8)$$

$\text{pad\_size}_k$ may denote the size of an area that is added through the k-th padding operation. In the k-th trimming operation corresponding to the k-th padding operation, removal of an area identical to the size added in the k-th padding operation may be performed in the k-th trimming operation.

In the above-described embodiments, although, for convenience of description, the case where four downscaling operations and four upscaling operations are performed has been exemplified, various numbers of downscaling operations and upscaling operations may be performed depending on the implementation of the encoding apparatus 100 and the decoding apparatus 200.

Detailed padding modes in embodiments may be implemented in various manners. For example, various padding schemes, such as zero-padding, mirror-padding, and edge-padding, may be used.

The padding and trimming in the embodiments may also be applied to left/right and upper/lower locations of an image represented by data, or any other locations of the image. The locations to which padding and trimming are to be applied may be neither specified nor limited. In other words, the areas to which padding and trimming in the embodiments are to be applied may vary depending on the implementation and applications.

Generally, trimming by the decoding apparatus 200 may be applied to the same area as the area on which padding has been performed by the encoding apparatus 100. Performing padding and trimming corresponding to each other in this way may be efficient from the standpoint of performance.

For example, when a k-th padding operation by the encoding apparatus 100 is performed to add an area below and an area right to the image, a k-th trimming operation by the decoding apparatus 200 may be performed to remove the area below and the area right to the image. Such addition and removal may be more profitable from the standpoint of performance.

In embodiments, for simplification of descriptions, descriptions may be made without distinguishing the width and the height of the image from each other. The padding, downscaling, upscaling, and trimming in the embodiments may be separately applied to each of the width and the height of an image.

Here, the order of padding and/or trimming that are performed with respect to the horizontal axis (or the width of the image) and the vertical axis of the image (or the height of the image) may not influence the size of an image generated through padding and/or trimming. Therefore, the order of padding and/or trimming that are performed with respect to the horizontal axis (or the width of the image) and the vertical axis of the image (or the height of the image) may vary depending on the implementation scheme.

In an embodiment, in order to describe padding and trimming schemes, an actual image compression scheme has been described in brief.

Most data compression technologies based on an existing neural network may be implemented based on a convolutional autoencoder-based structure, and all of embodiments may be applied to such a structure.

Further, because recent most entropy minimization-based data compression technologies use an encoder network and a decoder network and a code layer has a size spatially smaller than that of an input layer, the embodiments may be applied to data compression technologies.

Although the embodiments have been described as procedures for minimizing the areas of padding and trimming from the standpoint of data compression, the embodiments may provide the effect of reducing the uses of memory and a computational load from the standpoint of network driving. Therefore, the embodiments may be utilized in various fields in addition to data compression.

For example, a U-Net widely used in vision fields may have the architecture of performing a series of upscaling procedures after performing a series of downscaling procedures. For a network using such a U-Net architecture, the padding schemes described in the embodiments may be used to efficiently process inputs having various sizes.

The above embodiments may be performed by the encoding apparatus 100 and the decoding apparatus 200 using the same method and/or the corresponding method. Also, for encoding and/or decoding of the image, a combination of one or more of the above embodiments may be used.

The order of application of the embodiments may be different from each other in the encoding apparatus 100 and the decoding apparatus 200. Alternatively, the order of application of the embodiments may be (at least partially) identical to each other in the encoding apparatus 100 and the decoding apparatus 200.

The order of application of the embodiments may be different from each other in the encoding apparatus 100 and the decoding apparatus 200, and the order of application of the embodiments may be identical to each other in the encoding apparatus 100 and the decoding apparatus 200.

The above-described embodiments may be separately performed on each of a luma signal and a chroma signal. The above-described embodiments may be equally performed on the luma signal and the chroma signal.

In the above-described embodiments, it may be construed that, when specified processing is applied to a specified target, specified conditions may be required. Also, it may be construed that, when a description is made such that the specified processing is performed under a specified decision, whether the specified conditions are satisfied may be determined based on a specified coding parameter and that, alternatively, when a description is made such that a specified decision is made based on a specified coding parameter, the specified coding parameter may be replaced with an additional coding parameter. In other words, it may be considered that a coding parameter that influences the specified condition or the specified decision is merely exemplary, and it may be understood that, in addition to the specified coding parameter, a combination of one or more other coding parameters may function as the specified coding parameter.

In the above-described embodiments, although the methods have been described based on flowcharts as a series of steps or units, the present disclosure is not limited to the sequence of the steps and some steps may be performed in a sequence different from that of the described steps or simultaneously with other steps. Further, those skilled in the art will understand that the steps shown in the flowchart are not exclusive and may further include other steps, or that one or more steps in the flowchart may be deleted without departing from the scope of the disclosure.

The above-described embodiments include various aspects of examples. Although not all possible combinations for indicating various aspects can be described, those skilled in the art will recognize that additional combinations other than the explicitly described combinations are possible. Therefore, it may be appreciated that the present disclosure includes all other replacements, changes, and modifications belonging to the accompanying claims.

The above-described embodiments according to the present disclosure may be implemented as a program that can be executed by various computer means and may be recorded on a computer-readable storage medium. The computer-readable storage medium may include program instructions, data files, and data structures, either solely or in combination. Program instructions recorded on the storage medium may have been specially designed and configured for the present disclosure, or may be known to or available to those who have ordinary knowledge in the field of computer software.

The computer-readable storage medium may include information used in embodiments according to the present disclosure. For example, the computer-readable storage medium may include a bitstream, which may include various types of information described in the embodiments of the present disclosure.

The computer-readable storage medium may include a non-transitory computer-readable medium.

Examples of the computer-readable storage medium include all types of hardware devices specially configured to record and execute program instructions, such as magnetic media, such as a hard disk, a floppy disk, and magnetic tape, optical media, such as compact disk (CD)-ROM and a digital versatile disk (DVD), magneto-optical media, such as a floptical disk, ROM, RAM, and flash memory. Examples of the program instructions include machine code, such as code created by a compiler, and high-level language code executable by a computer using an interpreter. The hardware devices may be configured to operate as one or more software modules in order to perform the operation of the present disclosure, and vice versa.

There are provided a method, an apparatus, and a storage medium using padding/trimming in a compression neural network.

As described above, although the present disclosure has been described based on specific details such as detailed components and a limited number of embodiments and drawings, those are merely provided for easy understanding of the entire disclosure, the present disclosure is not limited to those embodiments, and those skilled in the art will practice various changes and modifications from the above description.

Accordingly, it should be noted that the spirit of the present disclosure is not limited to the above-described embodiments, and the accompanying claims and equivalents and modifications thereof fall within the scope of the present disclosure.

What is claimed is:

1. A decoding method performed by a decoding apparatus, comprising:
   receiving feature information from an encoding apparatus; and
   generating a reconstructed image by applying multiple upscaling operations and multiple trimming operations to an image represented by the feature information,
   wherein each of the multiple trimming operations is configured to remove one or more lines, identical to a number of one or more lines that are added through a padding operation performed by the encoding apparatus, from the image to which the upscaling operation is applied.

2. The decoding method of claim 1, wherein the multiple upscaling operations and the multiple trimming operations are applied to the image in an order in which one upscaling operation is applied to the image and thereafter one trimming operation corresponding to the upscaling operation is applied to the image.

3. The decoding method of claim 1, wherein a number of pairs of the multiple upscaling operations and the multiple trimming operations is identical to a number of pairs of multiple padding operations and multiple downscaling operations performed by the encoding apparatus.

4. The decoding method of claim 1, wherein each of the multiple upscaling operations is configured to adjust a size of the image to n times, where n is an integer equal to or greater than 2.

5. The decoding method of claim 1, wherein:
   each of the multiple upscaling operations is configured to increase a size of the image to n times, and
   n is an integer equal to or greater than 2.

6. The decoding method of claim 1, wherein number-of-lines information indicating numbers of one or more lines that are added through multiple padding operations performed by the encoding apparatus is received from the encoding apparatus.

7. The decoding method of claim 1, wherein:
   ratio information is received from the encoding apparatus,
   the ratio information includes ratios of multiple downscaling operations performed by the encoding apparatus or reciprocals of the ratios of the multiple downscaling operations performed by the encoding apparatus.

8. The decoding method of claim 7, wherein:
   a k-th upscaling operation, among the multiple upscaling operations, is configured to adjust a size of the image to $S_k$ times,
   k is an integer that is equal or greater than 1 and less than or equal to m,
   m is a number of the multiple downscaling operations, and
   $S_k$ is determined based on the ratio information.

9. The decoding method of claim 1, wherein:
   a k-th trimming operation on the image, among the multiple trimming operations, is configured to remove, from the image, a number of lines identical to a number of lines that are added through a k-th padding operation corresponding to the k-th trimming operation, among multiple padding operations performed by the encoding apparatus,
   k is an integer that is equal to or greater than 1 and less than or equal to m, and
   m is a number of the multiple downscaling operations.

10. The decoding method of claim 9, wherein:
- a padding operation performed in a k-th order, among m padding operations performed by the encoding apparatus, corresponds to a trimming operation performed in an (m−k+1)-th order, among m trimming operations performed by the decoding apparatus,
- k is an integer that is equal to or greater than 1 and less than or equal to m, and
- m is a number of the multiple downscaling operations.

11. A computer-readable storage medium storing a bitstream, the bitstream comprising feature information, wherein:
- a reconstructed image is generated by applying multiple upscaling operations and multiple trimming operations to an image represented by the feature information,
- wherein each of the multiple trimming operations is configured to remove one or more lines, identical to a number of one or more lines that are added through a padding operation performed by the encoding apparatus, from the image to which the upscaling operation is applied.

\* \* \* \* \*